April 10, 1956 A. ROWLEY 2,741,713
MINIATURE PRECISION MOTOR AND DRIVING ASSEMBLY
Filed July 12, 1954
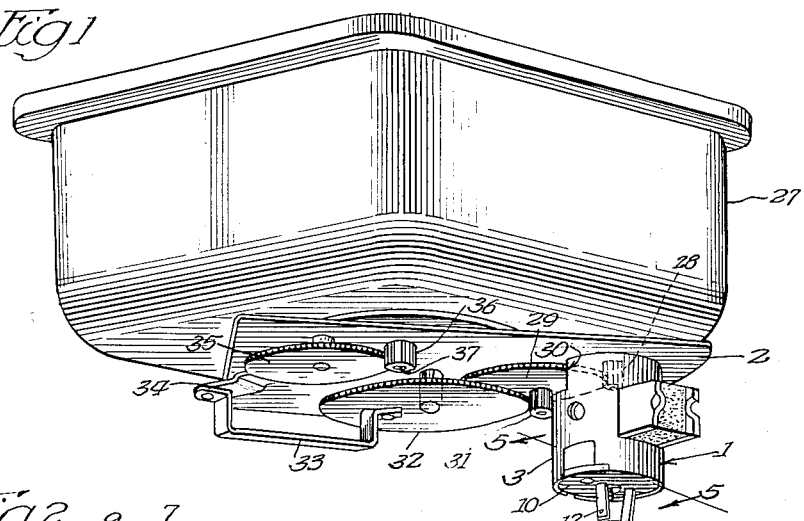
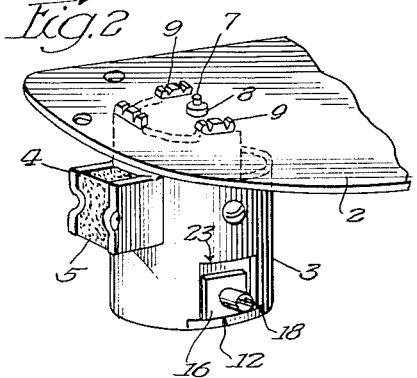
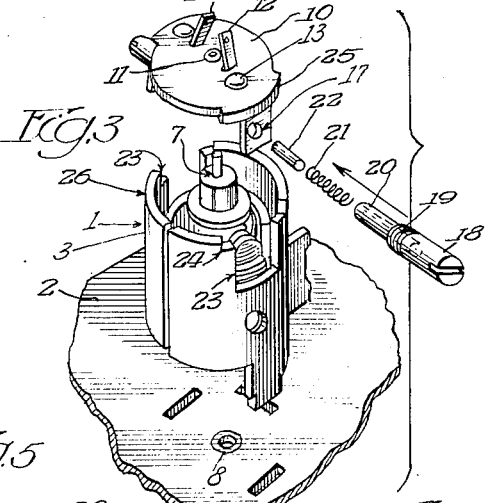
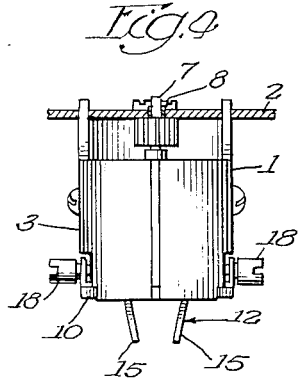
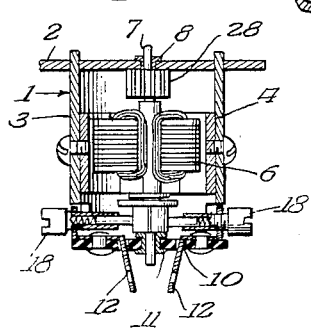
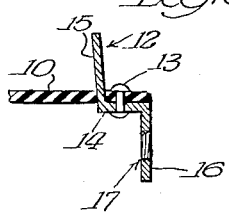
INVENTOR:
Arthur Rowley
By: Marzall, Johnston, Cook & Root.
Attys.

United States Patent Office 2,741,713
Patented Apr. 10, 1956

2,741,713

MINIATURE PRECISION MOTOR AND DRIVING ASSEMBLY

Arthur Rowley, Green Lake, Wis.

Application July 12, 1954, Serial No. 442,554

6 Claims. (Cl. 310—83)

This invention relates to a miniature motor in general, and particularly to a miniature motor of the type which is operated by dry cell batteries.

The invention comprises a miniature precision motor and driving assembly embodying a motor casing construction adapted to house a motor which is secured to a sheet metal plate. The driving assembly comprises certain elements and gearing which are also connected to the plate so that the entire assembly may be used for various purposes, such as for operating or driving a miniature or toy washing machine, barbecue or other elements and devices.

The primary object of the present invention consists in the provision of a miniature precision battery operated motor embodying a one-piece housing which is stamped from a single piece of sheet metal and then formed into circular form, the formed housing having parts cut away to accommodate operating parts of the motor and some of the mechanism driven thereby, as well as means for securing the motor to a plate in locked assembled position.

Another important object of the invention consists in the arrangement of attaching a motor and all its driving connections to a single plate, whereby the single plate may be mounted on an operating device, such as a washing machine, or other elements, as a single unitary unit.

Another important object of the invention consists in the provision of a new and improved motor closure or connector cap to which contact members are secured, the contact members embodying contact prongs and legs or ears to which motor brush cylinders are threadedly engaged, the brush cylinders housing springs which urge the brushes outwardly for contacting relationship with the motor armature.

A still further object of the invention consists in the provision of the location and assembly of parts, and the formation of certain of the elements so as to provide a precision motor which may be extremely economically manufactured.

Numerous other objects and advantages will be apparent throughout the progress of the specification which is to follow.

The accompanying drawing illustrates a selected embodiment of the invention, and the views therein are as follows:

Fig. 1 is a detail perspective view of a miniature or toy wash tub to which the invention is applied;

Fig. 2 is a detail perspective view showing the manner in which the motor is mounted to an attaching plate;

Fig. 3 is a detail exploded view showing various parts of the motor assembly;

Fig. 4 is a detail elevational view showing the manner in which the motor is secured to the attaching plate;

Fig. 5 is a detail elevational view showing the manner in which the motor parts are secured in position; and Fig. 6 is a detail sectional view showing the manner in which the contact members including the prongs and the brush supporting members are secured to the end disk.

The particular construction herein shown for the purpose of illustrating the invention comprises a miniature precision electric battery operated motor 1 which is mounted on a supporting plate 2. The motor 1 has a housing 3 which is preferably stamped from a single piece of non-magnetic sheet material, such as aluminum. After the sheet has been cut to the proper size and configuration, it is formed in relatively circular shape to receive the parts of the motor. Within the circular motor casing 3 there is a magnetic field member 4 having ends projecting outwardly of the casing, as indicated in Fig. 2. The magnetic field member is magnetized by a magnet 5. A motor armature 6 is arranged within the casing 3, and has its motor shaft 7 extending through the plate 1, there being a ferrule or sleeve 8 through which the motor shaft 7 extends and acts as a bearing in which the shaft 7 is journaled.

The motor casing or housing 3 may be provided with extensions 9, which pass through openings in the plate 2. The extensions 9 are peened over to secure the motor 1 to the plate 2, thereby closing one end of the motor housing 3. The opposite end of the motor housing is closed by a disk or connector member 10, Fig. 3, which is made of any suitable non-conductive material, such as fiber.

An opening is provided centrally of the disk 10 and receives a ferrule or sleeve 11, to form a bearing for the opposite end of the motor shaft 7. Contact members 12 are secured to the disk 10 by a rivet 13, which extends through a horizontal part 14 integral with the upper prong part 15 and also integral with a lower brush holder part 16. Each member 12, therefore, is in one continuous piece stamped from a single flat piece of copper, and bent in the angular formation shown in Fig. 6. The lower brush part 16 of the contact member 12 is provided with a threaded opening 17 to receive a cylindrical brush holder member 18. This cylinder member 18 is provided with exterior threads 19 which threadedly receive the threads of the opening 17. The cylinder 18 also includes an elongated extension 20 which is hollow to receive a spring 21 to press against a brush 22, for making contact with the motor armature, Fig. 3. The disk 10 provides a closure for one end of the motor housing. It includes the prongs 15 to which the electric wires are connected, and acts as a support for the motor brushes.

The motor housing 3 may be cut away on opposite sides, as indicated at 23, Fig. 3, to receive the extensions 16 on the contact members 12, permitting the brushes to engage the motor armature. The slots or openings 23 may be cut back as indicated at 24, Fig. 3, to receive projections or ears 25 on the disk 10 so that the disk will be maintained in proper non-rotative rigid position. The upper end 26 of the housing 3 may be bent or peened inwardly to lock the entire parts of the motor within its casing. The motor shaft 7 is journaled in its metal bearings 8 and 11, and is held in proper position by one end of the motor housing being secured to the plate, and the other end of the housing being closed by the disk 10.

The motor housing 3 contains all the operating elements of the motor and is locked in position. It may be secured to a single plate 2 for attachment to various devices, such as a miniature wash tub 27, Fig. 1. The motor shaft 7 has a pinion gear 28 secured thereto to drive a gear 29 which meshes with the pinion gear 28. The gear 29 is provided with a sleeve or bearing and is secured to the plate 2. An edge 30 of the housing 3 may be cut away as indicated in Fig. 1, to provide room for the gear 29. The gear 29 carries a pinion gear 31, which meshes with another gear 32, also rotatably mounted on the plate 2. Therefore, such gearing as is required to operate a rotating element is completely mounted and supported on the plate 2.

In the present embodiment shown, the motor is adapted to drive the agitator of a miniature washing machine, and in that instance a crank arm 33 has one end secured to the gear 32 and its other end connected to a crank arm 34. The inner end of the crank arm 34 is secured to a gear 35 to drive a pinion gear 36. The pinion gear is fixed to a drive shaft 37 which operates the agitator (not shown). The elements 33 to 36, inclusive, cause oscillation of the agitator or impeller shaft 37.

The invention provides a miniature motor construction which has greater precision than other motors used for similar purposes, and it may be made considerably cheaper than such conventional motors. The application of all the elements to a single plate permits the entire assembly to be used for many purposes, such as, for instance, a miniature or toy washing machine, as herein specifically shown, or for use in connection with a barbecue, as shown in applicant's copending application filed concurrently herewith, Serial No. 442,464.

The manner in which the housing is made provides a thoroughly rigid casing for the motor, and permits it to be attached to the supporting plate. A main feature, however, resides in the disk which carries the contact prongs and the brush assemblies, whereby they may be easily applied and replaced.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A miniature precision battery operated motor assembly comprising a casing, a plate closing one end of the casing, a disk closing the other end of the casing, a motor shaft, bearings in the plate and disk in which the motor shaft is journaled, contact prongs extending outwardly of the disk to which conductors may be connected, an integral strip on each prong under the disk, means fastening the strip to the disk, an integral leg bent from each strip and having a threaded opening therein, a cylinder closed at its outer end in threaded engagement with the threaded opening, a spring in said cylinder, a motor brush in said cylinder urged outwardly by said spring, projections on said casing and secured to the plate, gears revolubly mounted on said plate and operated by said motor, and an element on said plate adapted to be driven and operated by said gears.

2. A miniature battery operated motor comprising a motor casing, motor mechanism in said casing including a motor shaft, said casing being made from a sheet of non-magnetic material and formed into a tube, a plate closing one end of the casing, a bearing in said plate in which one end of the shaft is journaled, an electric contact disk arranged within the confines of the casing closing the other end of the casing, a bearing carried by said disk into which the other end of the shaft is journaled, and electric contacts mounted on said disk.

3. A miniature precision battery operated motor comprising a casing, motor appurtenances in said casing including a motor shaft and an armature on said shaft, a disk at one end of the casing and having a bearing to receive one end of the shaft, a pair of contact members fixed to said disk, each of said contact members including a contact prong projecting outwardly from one side of the disk to which an electric conductor may be connected, a part bent from the contact member and positioned on the other side of the disk, an integral extension bent from said part and having a threaded opening therein, a sleeve threadedly engaging said opening, a motor brush in said sleeve, a spring in said sleeve to urge the brush outwardly against said armature, extensions on said disk, said casing having cutouts to receive said latter extensions, a plate larger than the diameter of the casing and secured to the casing at the end opposite the disk, and gearing mounted on said plate and operated by said motor.

4. A miniature precision battery operated motor comprising a casing, motor appurtenances in said casing including a motor shaft and an armature on said shaft, a disk at one end of the casing and having a bearing to receive one end of the shaft, a pair of contact members fixed to said disk, each of said contact members including a contact prong projecting outwardly from one side of the disk to which an electric conductor may be connected, a part bent from the contact member and positioned on the other side of the disk, an integral extension bent from said part and having a threaded opening therein, a sleeve threadedly engaging said opening, a motor brush in said sleeve, a spring in said sleeve to urge the brush outwardly against said armature, and extensions on said disk, said casing having cutouts to receive said latter extensions, said casing having additional cutouts to receive said bent integral extension of each contact member.

5. A miniature precision battery operated motor comprising a casing, motor appurtenances in said casing including a motor shaft and an armature on said shaft, a disk at one end of the casing and having a bearing to receive one end of the shaft, a pair of contact members fixed to said disk, each of said contact members including a contact prong projecting outwardly from one side of the disk to which an electric conductor may be connected, a part bent from the contact member and positioned on the other side of the disk, an integral extension bent from said part and having a threaded opening therein, a sleeve threadedly engaging said opening, a motor brush in said sleeve, a spring in said sleeve to urge the brush outwardly against said armature, extensions on said disk, said casing having cutouts to receive said latter extensions, said casing having additional cutouts to receive said bent integral extension of each contact member, projections on said casing, and a plate closing the other end of the casing and receiving said projections.

6. A miniature precision battery operated motor comprising a casing, motor appurtenances in said casing including a motor shaft and an armature on said shaft, a disk at one end of the casing and having a bearing to receive one end of the shaft, a pair of contact members fixed to said disk, each of said contact members including a contact prong projecting outwardly from one side of the disk to which an electric conductor may be connected, a part bent from the contact member and positioned on the other side of the disk, an integral extension bent from said part and having a threaded opening therein, a sleeve threadedly engaging said opening, a motor brush in said sleeve, a spring in said sleeve to urge the brush outwardly against said armature, extensions on said disk, said casing having cutouts to receive said latter extensions, said casing having additional cutouts to receive said bent integral extension of each contact member, projections on said casing, and a plate closing the other end of the casing and receiving said projections, said casing having a cutout adjacent the plate to receive an operating member to be driven by said shaft.

References Cited in the file of this patent

UNITED STATES PATENTS

| | | |
|---|---|---|
| 1,536,329 | Caruso | May 5, 1925 |
| 1,858,870 | Apple | May 17, 1932 |
| 2,070,718 | Ehrlich | Feb. 16, 1937 |
| 2,334,040 | Schellens | Nov. 9, 1943 |
| 2,532,700 | Eurich et al. | Dec. 5, 1950 |
| 2,566,238 | Midgley | Aug. 28, 1951 |
| 2,685,043 | Durant | July 27, 1954 |